United States Patent
Xiao et al.

(10) Patent No.: US 12,555,470 B2
(45) Date of Patent: Feb. 17, 2026

(54) SOURCE TRACING METHOD FOR TRAFFIC CONGESTION, ELECTRONIC DEVICE AND STORAGE MEDIUM

(71) Applicant: Beijing Baidu Netcom Science Technology Co., Ltd., Beijing (CN)

(72) Inventors: Yixiong Xiao, Beijing (CN); Hao Yuan, Beijing (CN); Jingbo Zhou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 208 days.

(21) Appl. No.: 18/393,376

(22) Filed: Dec. 21, 2023

(65) Prior Publication Data

US 2024/0371259 A1    Nov. 7, 2024

(30) Foreign Application Priority Data

May 6, 2023   (CN) .......................... 202310507494.1

(51) Int. Cl.
   *G08G 1/01*   (2006.01)

(52) U.S. Cl.
   CPC .................................. *G08G 1/0133* (2013.01)

(58) Field of Classification Search
   CPC .. G08G 1/0133; G08G 1/0104; G08G 1/0112; G08G 1/0129; G08G 1/04; G08G 1/0125; G08G 1/065
   See application file for complete search history.

(56) References Cited

U.S. PATENT DOCUMENTS

| | | | |
|---|---|---|---|
| 2002/0045985 A1* | 4/2002 | Kerner | G08G 1/0104 |
| | | | 701/117 |
| 2011/0320111 A1 | 12/2011 | Sarma et al. | |
| 2022/0004909 A1* | 1/2022 | Li | G06N 5/022 |

FOREIGN PATENT DOCUMENTS

| | | |
|---|---|---|
| CN | 108335483 A | 7/2018 |
| CN | 112435473 A | 3/2021 |

(Continued)

OTHER PUBLICATIONS

Du, Mao et al.; "A Novel Approach to Calculate the Spatial-Temporal Correlation for Traffic Flow Based on the Structure of Urban Road Networks ad Traffic Dynamic There"; 2021; Sensors (Year: 2021).*

(Continued)

*Primary Examiner* — Joan T Goodbody
*Assistant Examiner* — Godfrey Aleksander Maciorowski
(74) *Attorney, Agent, or Firm* — Faegre Drinker Biddle & Reath LLP

(57) ABSTRACT

Provided is a source tracing method for traffic congestion, an electronic device and a storage medium, relating to the field of smart transportation, traffic management, traffic information processing and other technologies. The method includes: determining an undetermined road section and at least two reference road sections related to the undetermined road section from a target road network; obtaining a congestion infection distance between the undetermined road section and the reference road section within a target period; calculating a congestion time difference between a first congestion moment of the undetermined road section within the target period and a second congestion moment of the reference road section within the target period; and determining the undetermined road section as a congestion source of the target road network within the target period when determining that a correlation between the congestion infec- (Continued)

tion distance and the congestion time difference meets a preset correlation requirement.

20 Claims, 10 Drawing Sheets

(56) References Cited

FOREIGN PATENT DOCUMENTS

| CN | 112863176 A | 5/2021 |
|---|---|---|
| CN | 113553407 A | 10/2021 |
| CN | 113632426 A | 11/2021 |
| CN | 114333336 A | 4/2022 |
| WO | 2021073524 A1 | 4/2021 |

OTHER PUBLICATIONS

Du, "A Novel Approach to Calculate the Spatial-Temporal Correlation for Traffic Flow Based on the Structure of Urban Road Networks and Traffic Dynamic Theory", 2021; Sensors (Year: 2021).*

The State Intellectual Property Office of People's Republic of China; CN First Office Action; CN Application No. 202310507494. 1; 12 pages; dated Jun. 18, 2025.

Zhang, Jing et al.; Spatio-temporal Correlation Analysis of Urban Traffic Congestion Diffusion; 7 pages; English Abstract; Journal of Transportation Systems Engineering and Information Technology; vol. 15, No. 2; dated Apr. 15, 2015.

Zhang, Zhenlong et al.; Study on Spatio-temporal Distribution of Traffic Congestion and Its Influencing Factors Based on Real-time Traffic Data: A Case Study of Ancient City in Suzhou; English Abstract; China Academic Journal Electronic Publishing House; 9 pages; dated Jan. 15, 2020.

China National Intellectual Property Administration; Notice of Grant of Invention Patent Right and English translation; Chinese Application No. 202310507494.1; 9 pages; dated Nov. 7, 2025.

Du, Mao et al.; A Novel Approach to Calculate the Spatial-Temporal Correlation for Traffic Flow Based on the Structure of Urban Road Networks and Traffic Dynamic Theory; Sensors; 26 pages; Jul. 10, 2021.

* cited by examiner 6.00   7.00   9.00   10.00   12.00

| | Road section 1 | Road section 2 | Road section 3 | Road section 4 | Road section 5 | Road section 6 | Road section 7 | Road section 8 | Road section 9 | Road section 10 |
|---|---|---|---|---|---|---|---|---|---|---|
| Road section 1 | | | | 1 | 1 | | | | | |
| Road section 2 | | | | 1 | | | | | | |
| Road section 3 | | | | | 1 | | | | | |
| Road section 4 | | | | | | | 1 | | | |
| Road section 5 | | | | | | 1 | | | 1 | |
| Road section 6 | | | | | | | 1 | | | |
| Road section 7 | | | | | | | | 1 | | |
| Road section 8 | | | | | | | | | | |
| Road section 9 | | | | | | | | | | 1 |
| Road section 10 | | | | | | | | | | |

FIG. 6

| | Road section 1 | Road section 2 | Road section 3 | Road section 4 | Road section 5 | Road section 6 | Road section 7 | Road section 8 | Road section 9 | Road section 10 |
|---|---|---|---|---|---|---|---|---|---|---|
| Road section 1 | | | | 1.4 | 1.22 | | | | | |
| Road section 2 | | | | 1 | | | | | | |
| Road section 3 | | | | | 1 | | | | | |
| Road section 4 | | | | | | | 1 | | | |
| Road section 5 | | | | | | 1.7 | | | 1.1 | |
| Road section 6 | | | | | | | 1 | | | |
| Road section 7 | | | | | | | | 1 | | |
| Road section 8 | | | | | | | | | | |
| Road section 9 | | | | | | | | | 1 | |
| Road section 10 | | | | | | | | | | |

FIG. 7

SOURCE TRACING METHOD FOR TRAFFIC CONGESTION, ELECTRONIC DEVICE AND STORAGE MEDIUM

CROSS-REFERENCE TO RELATED APPLICATIONS

The present application claims the priority from Chinese Patent Application No. 202310507494.1, filed with the Chinese Patent Office on May 6, 2023, the content of which is hereby incorporated herein by reference in its entirety.

TECHNICAL FIELD

The present disclosure relates to the field of data processing technology, especially to the field of smart transportation, traffic management, traffic information processing and other technologies, and specifically to a source tracing method and apparatus for traffic congestion, an electronic device and a storage medium.

BACKGROUND

With the acceleration of urbanization, the demand for transportation continues to increase, so that the problem of urban traffic congestion is increasingly serious. Therefore, the determination of the congestion source plays a vital role in urban traffic diversion. Currently, the congestion source is usually determined based on mobile phone signaling.

However, based on mobile phone signaling, a relatively large area can only be roughly determined as the congestion source, but the congestion source cannot be determined accurately.

SUMMARY

The present disclosure provides a source tracing method and apparatus for traffic congestion, an electronic device and a storage medium.

According to an aspect of the present disclosure, provided is a source tracing method for traffic congestion, including:
determining an undetermined road section and at least two reference road sections related to the undetermined road section from a target road network; where each reference road section is a road section into which a vehicle stream of the undetermined road section is capable of flowing;
obtaining a congestion infection distance between the undetermined road section and the reference road section within a target period;
calculating a congestion time difference between a first congestion moment of the undetermined road section within the target period and a second congestion moment of the reference road section within the target period; and
determining the undetermined road section as a congestion source of the target road network within the target period when determining that a correlation between the congestion infection distance and the congestion time difference meets a preset correlation requirement.

According to another aspect of the present disclosure, provided is a source tracing apparatus for traffic congestion, including:
a road section determining unit configured to determine an undetermined road section and at least two reference road sections related to the undetermined road section from a target road network; where each reference road section is a road section into which a vehicle stream of the undetermined road section is capable of flowing;
a infection distance obtaining unit configured to obtain a congestion infection distance between the undetermined road section and the reference road section within a target period;
a time difference calculation unit configured to calculate a congestion time difference between a first congestion moment of the undetermined road section within the target period and a second congestion moment of the reference road section within the target period; and
a congestion source determining unit configured to determine the undetermined road section as a congestion source of the target road network within the target period when determining that a correlation between the congestion infection distance and the congestion time difference meets a preset correlation requirement.

According to yet another aspect of the present disclosure, provided is an electronic device, including:
at least one processor;
a memory connected in communication with the at least one processor;
where the memory stores an instruction executable by the at least one processor, and the instruction, when executed by the at least one processor, enables the at least one processor to execute the method of any embodiment of the present disclosure.

According to yet another aspect of the present disclosure, provided is a non-transitory computer-readable storage medium storing a computer instruction thereon, and the computer instruction is used to cause a computer to execute the method according to any one of the embodiments of the present disclosure.

According to yet another aspect of the present disclosure, provided is a computer program product including a computer program, and the computer program implements the method according to any one of the embodiments of the present disclosure, when executed by a processor.

The present disclosure can improve the accuracy in determining the congestion source.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

FIG. 6 is a schematic diagram of a spatial adjacency matrix according to an embodiment of the present disclosure;

FIG. 7 is a schematic diagram of a distance adjacency matrix according to an embodiment of the present disclosure;

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

As mentioned in the background art, currently the congestion source is usually determined based on mobile phone signaling. However, based on mobile phone signaling, a relatively large area can only be roughly determined as the congestion source, but the congestion source cannot be determined accurately.

Figure 1:
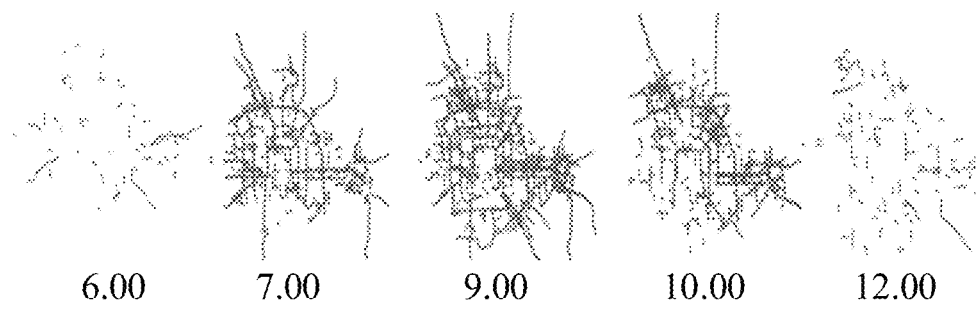
FIG. 1 is a schematic diagram of a change trend of the congestion state according to an embodiment of the present disclosure.
Figure 2:
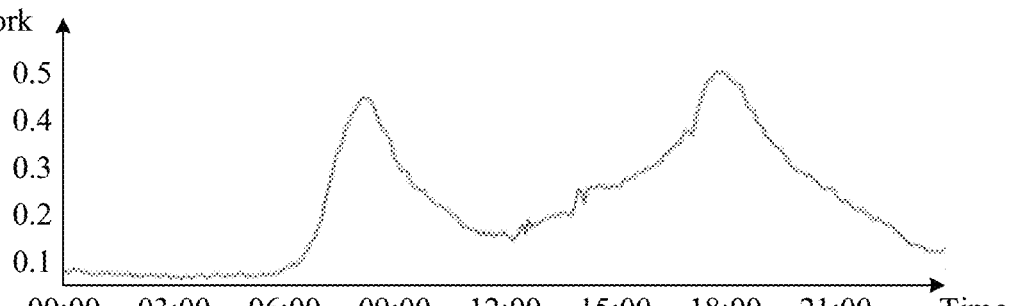
FIG. 2 is a schematic diagram of another change trend of the congestion state according to an embodiment of the present disclosure.

The inventor has found from research that the change trend of the congestion state of the traffic road network over time is similar to the virus spread trend in the mechanism of infectious diseases, that is, the congestion firstly appears sporadically, then gradually infects surrounding adjacent road sections, then reaches the peak of infection, and then gradually dissipate. Referring to FIG. 1, in the morning period of a day, sporadic congested road sections have appeared in the traffic road network at 6:00, the congestion states of the congested road sections gradually infect the surrounding adjacent road sections after 6:00, then the peak of infection is reached at 9:00, and then the congestion gradually dissipates after 9:00. Similarly, referring to FIG. 2, in the afternoon period of that day, sporadic congested road sections appear again in the traffic road network at 15:00, the congestion states of the congested road sections gradually infect the surrounding adjacent road sections after 15:00, then the peak of infection is reached at 18:00, and then the congestion gradually dissipates after 18:00. Based on this, it can be understood that the congestion state of the traffic road network usually shows a high spatial correlation, that is, the closer the road section is to the congestion source, the faster the infection speed of the congestion state is, and the earlier the congestion state will appear. At the same time, the congestion state of the traffic road network also has a strong time correlation. For example, the congestion state is more serious during the morning peak period and evening peak period.

Figure 3:
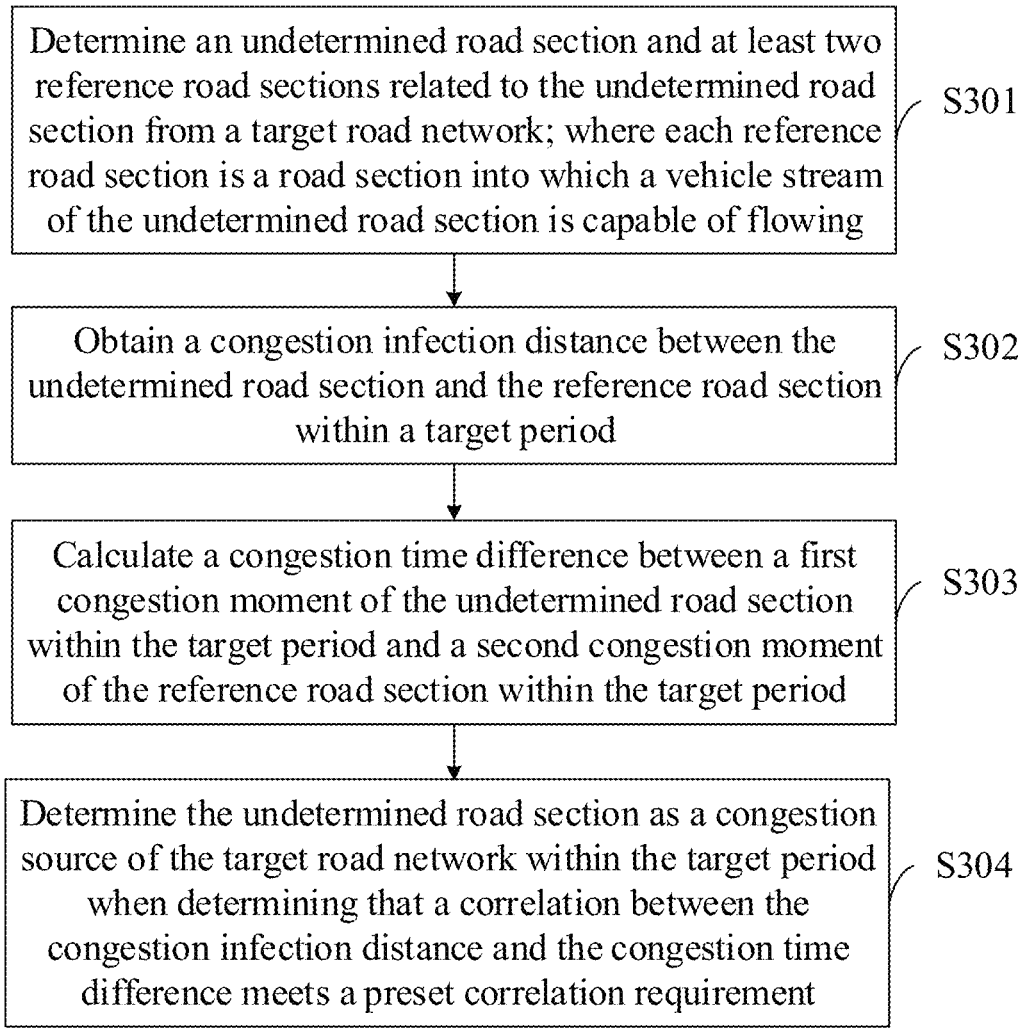
FIG. 3 is a schematic flow chart of a source tracing method for traffic congestion according to an embodiment of the present disclosure.

Based on the above research, an embodiment of the present disclosure provides a source tracing method for traffic congestion, which can be applied to an electronic device. Hereinafter, a source tracing method for traffic congestion according to the embodiment of the present disclosure will be described with reference to the schematic flow chart shown in FIG. 3. It should be noted that a logical sequence is shown in the schematic flow chart, but the steps shown or described may also be performed in other sequences in some cases.

Step S301: determining an undetermined road section and at least two reference road sections related to the undetermined road section from a target road network; where each reference road section is a road section into which a vehicle stream of the undetermined road section is capable of flowing;

Step S302: obtaining a congestion infection distance between the undetermined road section and the reference road section within a target period;

Step S303: calculating a congestion time difference between a first congestion moment of the undetermined road section within the target period and a second congestion moment of the reference road section within the target period; and Step S304: determining the undetermined road section as a congestion source of the target road network within the target period when determining that a correlation between the congestion infection distance and the congestion time difference meets a preset correlation requirement.

Figure 4:
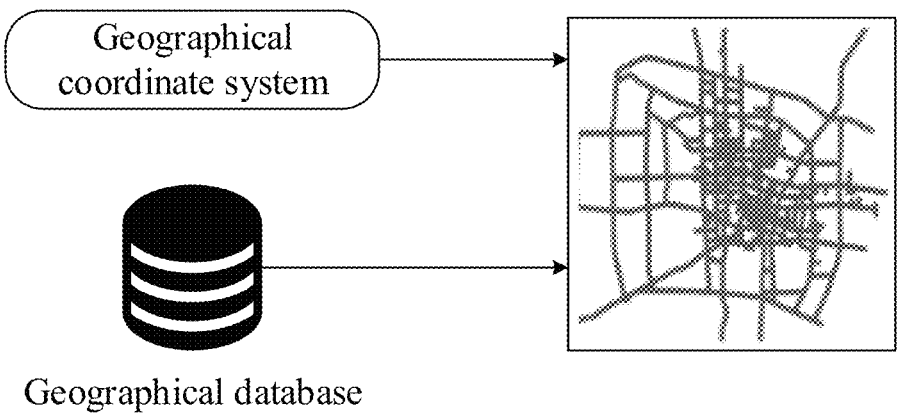
FIG. 4 is a schematic diagram of the creation principle of a target road network according to an embodiment of the present disclosure.

Here, the target road network may be used to represent the traffic road network of a target area, and the target area may be a city area, a district or county area, or any designated area. Moreover, referring to FIG. 4, in the geographical coordinate system, the longitude and latitude coordinates are usually used to represent the position of a point, a point string is used to represent the position of a line, and a plane is used to represent the position of an area. Based on this, in order to obtain the road representation at the road section level, a intersection set of the coordinate information of point strings constituting road sections and the regional location of the target area in the geographical coordinate system may be obtained based on a geographical database to obtain the traffic road network of the target area as the target road network in the embodiment of the present disclosure. Here, the road section may be a driving segment between two adjacent road nodes, and the road nodes are usually equipped with road traffic indicating devices such as traffic light, crosswalk and stop sign.

Here, the undetermined road section may be any specified road section in the target road network, or may be selected from the target road network according to a preset screening condition. For example, the road section with a starting congestion moment earlier than a source tracing cutoff moment in the target road network may be determined as the undetermined road section, where the source tracing cutoff moment may be the ending moment of the target period. Moreover, in an embodiment of the present disclosure, the target period may be a time period, of which the time length is a preset duration threshold, before the arrival of the preset peak period. Here, the preset duration threshold may be set in advance, for example, may be set to 30 minutes (min), 1 hour (h), 2 h, etc. The preset duration threshold may also be set according to the number of road sections in the target road network, which is not limited in the embodiment of the present application. In a specific example, the preset duration threshold may be positively correlated with the number of road sections in the target road network.

After the undetermined road section is determined from the target road network, at least two reference road sections related to the undetermined road section may continue to be determined from the target road network based on the structural information of the target road network. Here, the reference road section is a road section into which a vehicle stream of the undetermined road section can flow, for example, may be a road section into which the vehicle stream of the undetermined road section can flow directly, or a road section into which the vehicle stream of the undetermined road section can flow indirectly. Moreover, in an embodiment of the present disclosure, at least two reference road sections related to the undetermined road section may be determined from the target road network according to the target order, where the target order may be used to limit the determination range of the reference road sections. For example, if the target order is 1, all road sections that are first-order related (adjacent) to the undetermined road section may be determined from the target road network as the reference road sections. For another example, if the target order is 3, all road sections that are third-order related to the undetermined road section (spaced by two road sections) may be determined from the target road network as the reference road sections. Here, the target order may be set in advance or may be set according to the number of road sections in the target road network, which is not limited in the embodiment of the present disclosure. In a specific example, the target order may be positively correlated with the number of road sections in the target road network.

After the undetermined road section and at least two reference road sections related to the undetermined road section are determined from the target road network, the congestion infection distance between the undetermined road section and the reference road section within the target period may be obtained. Here, the congestion infection distance is not a conventional physical distance, but is used to characterize an effective infection distance used for infecting the congestion state from the undetermined road section to the reference road section. The smaller the congestion infection distance, the faster the infection speed of the congestion state, and the earlier the congestion state will appear.

In the embodiment of the present disclosure, it is also necessary to calculate the congestion time difference between the first congestion moment of the undetermined road section within the target period and the second congestion moment of the reference road section within the target period. In a specific example, the first congestion moment may be a starting congestion moment of the undetermined road section within the target period, and correspondingly, the second congestion moment may also be a starting congestion moment of the reference road section within the target period. In another specific example, the first congestion moment may be a severe congestion moment of the undetermined road section within the target period, and correspondingly, the second congestion moment may also be a severe congestion moment of the reference road section within the target period.

The congestion infection distance and congestion time difference corresponding to each reference road section are obtained and combined into a related parameter group. After at least two related parameter groups are obtained, the correlation analysis between the congestion infection distance and congestion time difference may be performed based on the at least two related parameter groups, to obtain the correlation between the congestion infection distance and the congestion time difference. Then, when the correlation between the congestion infection distance and the congestion time difference is determined to meet the preset correlation requirement, the undetermined road section is determined as the congestion source of the target road network within the target period. Here, the preset correlation requirement may be that the congestion infection distance has an obvious positive correlation with the congestion time difference.

In the source tracing method for traffic congestion provided in the embodiment of the present disclosure, after the undetermined road section and at least two reference road sections related to the undetermined road section are determined from the target road network, the congestion infection distance between the undetermined road section and the reference road section within the target period is obtained, the congestion time difference between the first congestion moment of the undetermined road section within the target period and the second congestion moment of the reference road section within the target period is calculated, and then the undetermined road section is determined as the congestion source of the target road network within the target period when determining that the correlation between the congestion infection distance and the congestion time difference meets the preset correlation requirement. In this process, on the one hand, the traceability granularity of traffic congestion is reduced to the road section level; and on the other hand, based on the congestion infection characteristic of the traffic road network (the congestion state usually shows a high spatial correlation, that is, the closer the road section is to the congestion source, the faster the infection speed of the congestion state is, and the earlier the congestion state will appear), the space-time characteristic of traffic congestion is deeply explored by calculating the correlation between the congestion infection distance and the congestion time difference and limiting the reference period for congestion traceability to the target period. Therefore, the accuracy in determining the congestion source can be improved compared with the prior art.

In some optional implementations, the source tracing method for traffic congestion may further include the following steps:
  determining a preset peak period;
  obtaining a starting moment of the preset peak period; and
  determining the target period based on the starting moment of the preset peak period.

Here, the preset peak period may be a peak period during which the traffic demand is relatively large, for example, may be a morning peak period, an evening peak period or other designated peak period, which is not limited in the embodiment of the present application.

After the preset peak period is determined, the starting moment of the preset peak period can be obtained, and then the target period is determined based on the starting moment of the preset peak period. In a specific example, the starting moment of the preset peak period can be used as the ending moment of the target period. For example, if the preset peak period is the morning peak period and the morning peak period is 07:00 to 09:00, then 07:00 may be the end moment of the target period, and the obtained target period may be 06:00 to 07:00. For another example, if the preset peak period is the evening peak period and the evening peak period is 17:00 to 19:00, then 17:00 may be the end moment of the target period, and the obtained target period may be 16:00 to 17:00.

Through the above steps, in the embodiment of the present disclosure, the preset peak period can be determined, the starting moment of the preset peak period is obtained, and the target period is determined based on the starting moment of the preset peak period. In this process, since the target period is automatically determined, the degree of automation of the source tracing method for traffic congestion can be improved. Moreover, it can be understood that, in the embodiment of the present disclosure, the preset peak period may be a peak period during which the traffic demand is relatively large, and the target period is strongly related to the preset peak period, so the correlation of the source tracing method for traffic congestion with the preset peak period can be enhanced to improve the usability value of the source tracing method for traffic congestion.

Moreover, as mentioned above, the road section with the starting congestion moment earlier than the source tracing cutoff moment in the target road network may be determined as the undetermined road section in the embodiment of the present disclosure. Based on this, in some optional implementations, "determining the undetermined road section from the target road network" may include the following step:

determining a road section with a starting congestion moment earlier than a source tracing cutoff moment in the target road network as the undetermined road section; where the source tracing cutoff moment is an ending moment of the target period.

Here, the source tracing cutoff moment may be the ending moment of the target period, and the ending moment of the target period may be the starting moment of the preset peak period. Based on this, it can be understood that a target number of road sections that have experienced congestion before the preset peak period arrives in the target road network can be determined as undetermined road sections in the embodiment of the present disclosure. In a specific example, a target number of road sections that have experienced congestion before the preset peak period arrives and have the earliest starting congestion moment in the target road network can be determined as undetermined road sections. Here, the target number may be set in advance or may be set according to the number of road sections in the target road network, which is not limited in the embodiment of the present disclosure. In a specific example, the target number may be positively correlated with the number of road sections in the target road network.

In an embodiment of the present disclosure, for each road section, the starting congestion moment can be determined based on the congestion index of the road section. Here, the congestion index can be a conceptual value used to characterize whether a road section is smooth or congested, and the congestion index can be obtained based on the pre-constructed congestion data information.

Here, the congestion data information can be generated in the following way:

determining the statistical cycle of the congestion index, for example, using 5 minutes (min) as the statistical cycle, where 24 hours in a day can be divided into 288 statistical cycles; and calculating and storing the congestion index of each road section in any statistical cycle, to generate the congestion data information.

Here, the congestion index of each road section in a statistical cycle may be the ratio of the vehicle stream speed of the road section during the statistical cycle to the vehicle stream speed of the road section when there is no obstruction at night.

Here, the congestion data information may also include a statistical date, and the starting moment and ending moment of each statistical cycle within the statistical date.

In a specific example, one statistical cycle is 5 minutes, the starting moment of the statistical cycle 1 is 00:00, the ending moment of the statistical cycle 1 is 00:05, the starting moment of the statistical cycle 2 is 00:05, the ending moment of the statistical cycle 2 of is 00:10, the starting moment of the statistical cycle 3 is 00:10, the ending moment of the statistical cycle 3 is 00:15, and so on. Finally, when the statistical date is Apr. 20, 2023, the congestion data information as shown in Table 1 can be obtained.

TABLE 1

| | Statistical date (April 20, 2023) | | | |
|---|---|---|---|---|
| | Statistical cycle 1 00:00 to 00:05 | Statistical cycle 2 00:05 to 00:10 | Statistical cycle 3 00:10 to 00:15 | Statistical cycle 288 ... 23:55 to 00:00 |
| Road section 1 | Congestion index 1-1 | Congestion index 1-2 | Congestion index 1-3 | ... Congestion index 1-288 |
| Road section 2 | Congestion index 2-1 | Congestion index 2-2 | Congestion index 2-3 | ... Congestion index 2-288 |
| Road section 3 | Congestion index 3-1 | Congestion index 3-2 | Congestion index 3-3 | ... Congestion index 3-288 |
| ... | ... | ... | ... | ... ... |

It should be noted that the congestion data information may also have other data structures different from those shown in Table 1 in the embodiment of the present disclosure, which will be omitted here.

In an embodiment of the present disclosure, for each road section, the starting congestion moment can be determined based on the congestion index of the road section. For example, the statistical cycle corresponding to the first congestion index greater than the first congestion threshold among a plurality of congestion indexes of the road section before the source tracing cutoff moment can be determined as the target cycle, and then the starting moment of the target cycle can be determined as the starting congestion moment of the road section. Here, the first congestion threshold can be set according to actual application requirements, and is not limited in the embodiment of the present disclosure.

Since the road section with the starting congestion moment earlier than the source tracing cutoff moment in the target road network is usually the most likely congestion source of the target road network within the target period, the road section with the starting congestion moment earlier than the source tracing cutoff moment in the target road network is directly determined as the undetermined road section through the above steps in the embodiment of the present disclosure, achieving the relatively accurate selection of the undetermined road section, and thereby improving the efficiency in determining the congestion source.

Moreover, as mentioned above, in an embodiment of the present disclosure, the first congestion moment is the starting congestion moment of the undetermined road section within the target period, and the second congestion moment is the starting congestion moment of the reference road section within the target period; or, the first congestion moment is the severe congestion moment of the undetermined road section within the target period, and the second congestion moment is the severe congestion moment of the reference road section within the target period.

In an embodiment of the present disclosure, after the congestion data information is obtained, the first congestion moment of the undetermined road section within the target period and the second congestion moment of the reference road section within the target period can be determined based on the congestion data information.

In a specific example, the first congestion moment is the starting congestion moment of the undetermined road section within the target period, and the second congestion moment is the starting congestion moment of the reference road section within the target period. Therefore, the statistical cycle corresponding to the first congestion index greater than the first congestion threshold among a plurality of congestion indexes of the undetermined road section within the target period can be determined as a first cycle, and then the starting moment of the first cycle can be determined as the starting congestion moment of the undetermined road section, i.e., the first congestion moment; and the statistical cycle corresponding to the first congestion index greater than the second congestion threshold among a plurality of congestion indexes of the reference road section within the target period can be determined as a second cycle, and then the starting moment of the second cycle can be determined as the starting congestion moment of the reference road section, i.e., the second congestion moment. Here, the first congestion threshold and the second congestion threshold can be set according to actual application requirements, and are not limited in the embodiment of the present disclosure. Moreover, the second congestion threshold may be less than or equal to the first congestion threshold in an embodiment of the present disclosure.

In another specific example, the first congestion moment is the severe congestion moment of the undetermined road section within the target period, and the second congestion moment is the severe congestion moment of the reference road section within the target period. Therefore, the statistical cycle corresponding to the congestion index with the largest value among a plurality of congestion indexes of the undetermined road section within the target period can be determined as a third cycle, and then the starting moment of the third cycle can be determined as the severe congestion moment of the undetermined road section, i.e., the first congestion moment; and the statistical cycle corresponding to the congestion index with the largest value among a plurality of congestion indexes of the reference road section within the target period can be determined as a fourth cycle, and then the starting moment of the fourth cycle can be determined as the severe congestion moment of the reference road section, i.e., the second congestion moment.

The first congestion moment is the starting congestion moment of the undetermined road section within the target period, and the second congestion moment is the starting congestion moment of the reference road section within the target period; or, the first congestion moment is the severe congestion moment of the undetermined road section within the target period, and the second congestion moment is the severe congestion moment of the reference road section within the target period, so there is a high degree of correspondence between the first congestion moment of the undetermined road section within the target period and the second congestion moment of the reference road section within the target period, improving the reliability of the congestion time difference to further improve the accuracy in determining the congestion source.

In some optional implementations, "obtaining the congestion infection distance between the undetermined road section and the reference road section within the target period" may include the following steps:

determining at least one candidate path related to the reference road section from the target road network; where the candidate path is a path through which a vehicle stream flows in from the undetermined road section and flows out from the reference road section;

obtaining an effective path infection distance of the candidate path within the target period to obtain at least one effective path infection distance; and determining an effective path infection distance with a minimum value among the at least one effective path infection distance as the congestion infection distance between the undetermined road section and the reference road section within the target period.

For each reference road section, when the vehicle stream of the undetermined road section can directly flow into the reference road section, only one candidate path related to the reference road section can be determined from the target road network, the starting point of this candidate path is the undetermined road section, and the ending point of this candidate path is the reference road section.

For each reference road section, when the vehicle stream of the undetermined road section can indirectly flow into the reference road section, only one candidate path related to the reference road section may be determined from the target road network, the starting point of this candidate path is the undetermined road section, and the ending point of this candidate path is the reference road section; or at least two candidate paths related to the reference road section may be determined from the target road network, the starting point of each candidate path is the undetermined road section, and the ending point of each candidate path is the reference road section.

For each reference road section, after at least one candidate path related to the reference road section is determined from the target road network, the effective path infection distance of each candidate path within the target period can be obtained to obtain at least one effective path infection distance, and then the effective path infection distance with the minimum value among the at least one effective path infection distance can be determined as the congestion infection distance between the undetermined road section and the reference road section within the target period.

Figure 5:
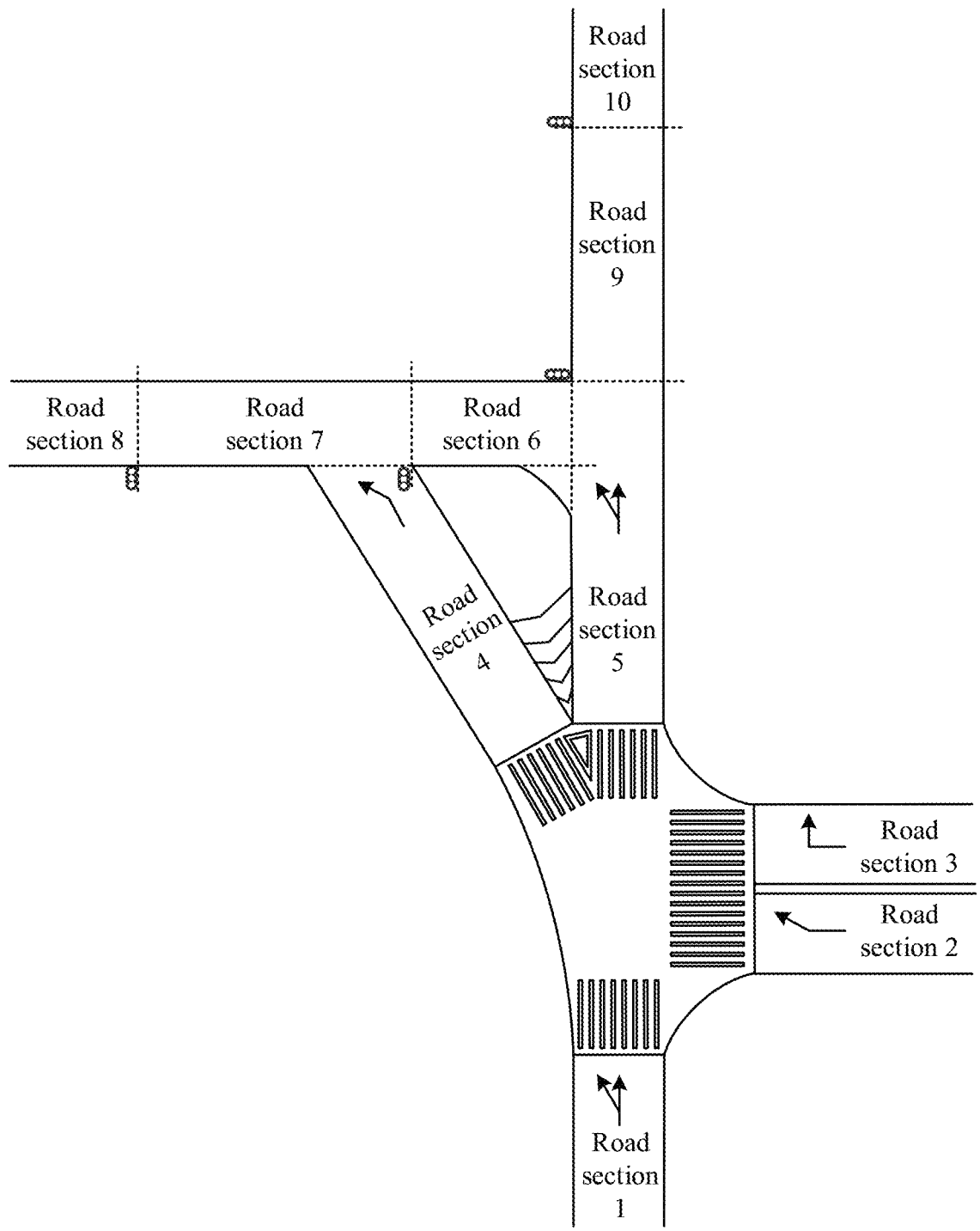
FIG. 5 is a schematic diagram of structural information of a target road network according to an embodiment of the present disclosure.

Referring to FIG. 5, it is assumed that the undetermined road section determined from the target road network is road section 1 and the target order is 3, so the reference road sections related to the undetermined road section include road section 4, road section 5, road section 6, road section 7, road section 8, road section 9 and road section 10.

Here, the vehicle stream of the road section 1 can directly flow into the road section 4, and only one candidate path related to the road section 4 (that is, road section 1→road section 4) can be determined from the target road network, so the effective path infection distance of the candidate path (road section 1→road section 4) can be determined as the congestion infection distance between the road section 1 and road section 4 within the target period.

The vehicle stream of the road section 1 can indirectly flow into the road section 6, and only one candidate path related to the road section 6 (that is, road section 1→road section 5→road section 6) can be determined from the target road network, so the effective path infection distance of the candidate path (road section 1→road section 5→road section 6) can be determined as the congestion infection distance between the road section 1 and road section 6 within the target period.

The vehicle stream of the road section 1 can indirectly flow into the road section 7, and two candidate paths related to the road section 7 (that is, road section 1→road section 4→road section 7, and road section 1→road section 5→road section 6→road section 7) can be determined from the target road network, so the effective path infection distance with the minimum value among the effective path infection distance of the candidate path (road section 1→road section 4→road section 7) and the effective path infection distance of the candidate path (road section 1→road section 5→road section 6→road section 7) can be determined as the congestion infection distance between the road section 1 and road section 7 within the target period.

According to the structural information of the target road network, there may be more than one candidate path through which the vehicle stream flows in from the undetermined road section and flows out from the reference road section, and each candidate path corresponds to an effective path infection distance. Therefore, considering the actual driving scenario, it can be determined that the effective path infection distance with the minimum value is the most valuable for reference. Based on this, through the above steps, in the embodiment of the present disclosure, for each reference road section, after at least one candidate path related to the reference road section is determined from the target road network, the effective path infection distance of each candidate path within the target period can be obtained to obtain at least one effective path infection distance, and then the effective path infection distance with the minimum value among the at least one effective path infection distance can be determined as the congestion infection distance between the undetermined road section and the reference road section within the target period, thereby improving the reliability of the congestion infection distance to further improve the accuracy in determining the congestion source.

In some optional implementations, "obtaining the effective path infection distance of the candidate path within the target period" may include the following steps:
  obtaining an effective road section infection distance of any two adjacent target road sections in the candidate path within the target period as a target road section infection distance;
  when there is one target road section infection distance, determining the target road section infection distance as the effective path infection distance of the candidate path within the target period; and
  when there are at least two target road section infection distances, determining a sum of the at least two target road section infection distances as the effective path infection distance of the candidate path within the target period.

As mentioned above, each candidate path may only include two adjacent target road sections. In this case, after the effective road section infection distance of the two adjacent target road sections in the candidate path within the target period is obtained as a target road section infection distance, the target road section infection distance can be determined as the effective path infection distance of the candidate path within the target period.

Each candidate path may also include at least three adjacent target road sections. In this case, after the effective road section infection distance of any two adjacent target road sections in the candidate path within the target period is obtained as a target road section infection distance to obtain at least two target road section infection distances, the sum of the at least two target road section infection distances can be determined as the effective path infection distance of the candidate path within the target period.

Continuing to take the target road network shown in FIG. 5 as an example, the undetermined road section is road section 1 and the target order is 3, so the reference road sections related to the undetermined road section include road section 4, road section 5, road section 6, road section 7, road section 8, road section 9 and road section 10.

Here, the candidate path (road section 1→road section 4) includes only two adjacent target road sections. Therefore, after the effective road section infection distance between the road section 1 and road section 4 within the target period is obtained as a target road section infection distance, the target road section infection distance can be determined as the effective path infection distance of the candidate path (road section 1→road section 4) within the target period.

The candidate path (road section 1→road section 5→road section 6) includes three adjacent target road sections. Therefore, after the effective road section infection distance between the road section 1 and road section 5 within the target period is obtained as a target road section infection distance and the effective road section infection distance between the road section 5 and road section 6 within the target period is obtained as a target road section infection distance, the sum of the two target road section infection distances can be determined as the effective path infection distance of the candidate path (road section 1→road section 5→road section 6) within the target period.

Through the above steps, in the embodiment of the present disclosure, the effective road section infection distance between any two adjacent target road sections in the candidate path within the target period can be obtained as the target road section infection distance, and then: when the number of target road section infection distances is one, the target road section infection distance is determined as the effective path infection distance of the candidate path within the target period; when the number of target road section infection distances is at least two, the sum of the at least two target road section infection distances is determined as the effective path infection distance of the candidate path within the target period, so that the effective path infection distance is refined into the integration of the target road section infection distances, improving the reliability of the effective path infection distance to further improve the accuracy in determining the congestion source.

In some optional implementations, "obtaining the effective road section infection distance between any two adjacent target road sections in the candidate path within the target period" may include the following step:
  querying the effective road section infection distance of any two adjacent target road sections in the candidate path within the target period from a distance adjacency matrix.

Here, the distance adjacency matrix may be pre-constructed and used to characterize the effective road section infection distance of any road section group in the target road network. Each road section group may include two adjacent road sections of which the flow relationship is flowable. For example, the target road network is as shown in FIG. 5, and then the distance adjacency matrix can be used to characterize the effective road section infection distance of a road section group (road section 1 & road section 4), the effective road section infection distance of a road section group (road section 4 & road section 7), the effective road section infection distance of a road section group (road section 7 & road section 8), and so on.

Through the above step, in the embodiment of the present disclosure, the effective road section infection distance between any two adjacent target road sections in the candidate path within the target period can be queried from the distance adjacency matrix. On the one hand, the efficiency in obtaining the effective road section infection distance can be improved; and on the other hand, no matter which road section is determined from the target road network as the undetermined road section, the effective road section infection distance can be queried through the distance adjacency matrix without real-time calculation, thus enhancing the flexibility in tracing the source of traffic congestion.

In some optional implementations, the source tracing method for traffic congestion may further include:
creating a spatial adjacency matrix used to characterize a flow relationship between any two adjacent road sections in the target road network;
determining a plurality of road section groups based on the spatial adjacency matrix;
where each of the road section groups includes two adjacent road sections of which a flow relationship is flowable;
obtaining an effective road section infection distance of the road section group within the target period; and
updating the spatial adjacency matrix based on the effective road section infection distance of the road section group within the target period, to obtain the distance adjacency matrix.

Here, the spatial adjacency matrix is used to characterize the flow relationship between any two adjacent road sections in the target road network. For example, when the flow relationship between two adjacent road sections is flowable, the calibration position of the two adjacent road sections can be assigned a value of 1 in the preset matrix framework. Otherwise, the calibration position can be assigned a value of 0 or a null value.

After the spatial adjacency matrix is created, a plurality of road section groups can be determined based on the spatial adjacency matrix, where each road section group includes two adjacent road sections of which the flow relationship is flowable. After that, the effective road section infection distance of each road section group within the target period is obtained, and then the spatial adjacency matrix is updated based on the effective road section infection distance of the road section group within the target period, to obtain the distance adjacency matrix, which is used to characterize the effective road section infection distance of each road section group in the road network within the target period.

Continuing to take the target road network shown in FIG. 5 as an example, the undetermined road section is road section 1 and the target order is 3, so the reference road sections related to the undetermined road section include road section 4, road section 5, road section 6, road section 7, road section 8, road section 9 and road section 10.

Here, the road section 1 and road section 2 are two adjacent road sections, and the flow relationship between the road section 1 and road section 2 is non-flowable, so the calibration position of the road section 1 and road section 2 can be assigned a null value; the road section 1 and road section 3 are two adjacent road sections, and the flow relationship between the road section 1 and road section 3 is non-flowable, so the calibration position of the road section 1 and road section 3 can be assigned a null value; the road section 1 and road section 4 are two adjacent road sections, and the flow relationship between the road section 1 and road section 4 is flowable, so the calibration position of the road section 1 and road section 4 can be assigned a value of 1; and so on. Finally, the spatial adjacency matrix as shown in FIG. 6 can be created.

Afterwards, the effective road section infection distance of each road section group within the target period is obtained. For example, the effective road section infection distance of the road section group (road section 1 & road section 4), the effective road section infection distance of the road section group (road section 4 & road section 7), the effective road section infection distance of the road section group (road section 7 & road section 8), etc. are obtained.

Then the spatial adjacency matrix is updated based on the effective road section infection distance of each road section group within the target period, to obtain the distance adjacency matrix as shown in FIG. 7.

Through the above steps, in the embodiment of the present disclosure, a spatial adjacency matrix can be created, and then a plurality of road section groups can be determined based on the spatial adjacency matrix, the effective road section infection distance of the road section group within the target period is obtained, and the spatial adjacency matrix is updated based on the effective road section infection distance of the road section group within the target period, to obtain the distance adjacency matrix. In this process, the distance adjacency matrix is created in stages. Specifically, the spatial adjacency matrix is firstly created, and then the distance adjacency matrix is obtained based on the spatial adjacency matrix, thereby improving the reliability of the distance adjacency matrix to further improve the accuracy in determining the congestion source.

In some optional implementations, "obtaining the effective road section infection distance of the road section group within the target period" may include the following steps:
obtaining a first traffic volume; where the first traffic volume is a traffic volume flowing from a first road section to a second road section in the road section group within the target period;
obtaining a second traffic volume; where the second traffic volume is a total traffic volume flowing out from the first road section within the target period; and
calculating the effective road section infection distance of the road section group within the target period based on the first traffic volume and the second traffic volume.

Here, the first traffic volume is the traffic volume flowing from the first road section to the second road section in the road section group within the target period, and the second traffic volume is the total traffic volume flowing out from the first road section within the target period. Here, the first traffic volume and the second traffic volume can be obtained based on the traffic video data collected by a video monitoring device such as bayonet camera, electronic police, bayonet electronic police integrated machine, etc., which will not be described here.

After the first traffic volume and the second traffic volume are obtained, the effective road section infection distance of the road section group within the target period can be calculated based on the first traffic volume and the second traffic volume. In a specific example, this process can be implemented by the following calculation logic:

$$d_{AX} = (1 - \log P_{AX}) \geq 1;$$
$$P_{AX} = F1/F2.$$

Here, $d_{AX}$ is the effective road section infection distance of the road section group within the target period, $P_{AX}$ is the ratio of the first traffic volume to the second traffic volume, F1 is the first traffic volume, and F2 is the second traffic volume.

Based on the above calculation logic, it can be understood that the effective road section infection distance between the first road section and the second road section within the target period is negatively correlated with the ratio of the first traffic volume to the second traffic volume within the target period. That is, when most of the vehicle stream flowing out from the first road section flows to the second road section within the target period, the ratio $P_{AX}$ of the first traffic volume to the second traffic volume is relatively large, and the effective road section infection distance $d_{AX}$ between the first road section and the second road section is relatively small, indicating that the infection speed of the congestion state from the first road section to the second road section is fast; on the contrary, when only a small part of the vehicle stream flowing out from the first road section flows to the second road section within the target period, the ratio $P_{AX}$ of the first traffic volume to the second traffic volume is relatively small, and the effective road section transmission distance day between the first road section and the second road section is relatively large, indicating that the infection speed of the congestion state from the first road section to the second road section is slow.

Continuing to take the target road network shown in FIG. 5 as an example, the undetermined road section is road section 1 and the target order is 3, so the reference road sections related to the undetermined road section include road section 4, road section 5, road section 6, road section 7, road section 8, road section 9 and road section 10.

Here, in the road section group (road section 1 & road section 4), the total traffic volume flowing out from the road section 1 within the target period is 100, and the traffic volume flowing from the road section 1 to the road section 4 within the target period is 40. Therefore, based on the above calculation logic, the effective road section infection distance of the road section group (road section 1 & road section 4) within the target period may be obtained as 1.4. In the road section group (road section 1 & road section 5), the total traffic volume flowing out from the road section 1 within the target period is 100, and the traffic volume flowing from the road section 1 to the road section 5 within the target period is 60. Therefore, based on the above calculation logic, the effective road section infection distance of the road section group (road section 1 & road section 5) within the target period may be obtained as 1.22. In the road section group (road section 2 & road section 4), the total traffic volume flowing out from the road section 2 within the target period is 100, and the traffic volume flowing from the road section 2 to the road section 4 within the target period is 100. Therefore, based on the above calculation logic, the effective road section infection distance of the road section group (road section 2 & road section 4) within the target period may be obtained as 1, and so on.

Figure 8:
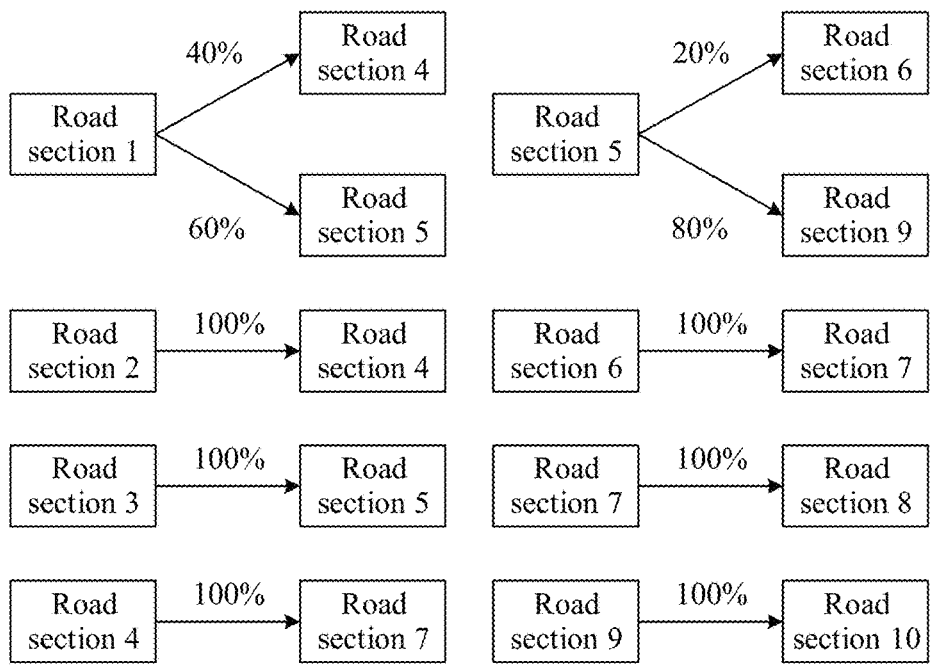
FIG. 8 is a representation diagram of a traffic volume relationship according to an embodiment of the present disclosure.

In the target period, when each road section group in the target road network has the traffic volume relationship as shown in FIG. 8, the distance adjacency matrix as shown in FIG. 7 can be finally obtained to characterize the effective road section infection distance of each road section group in the target road network within the target period.

Through the above steps, the first traffic volume and the second traffic volume can be obtained in the embodiment of the present disclosure. Here, the first traffic volume is the traffic volume flowing from the first road section to the second road section in the road section group within the target period, and the second traffic volume is the total traffic volume flowing out from the first road section within the target period. After that, the effective road section infection distance of the road section group within the target period is then calculated based on the first traffic volume and the second traffic volume. In this process, the correlation of the effective road section infection distance with the traffic flow between road sections can be deeply explored, and the actual causes of congestion on a road can be reflected in fine detail based on this, thereby further improving the accuracy in determining the congestion source.

In the embodiment of the present disclosure, in addition to querying the effective road section infection distance between any two adjacent target road sections in the candidate path within the target period from the distance adjacency matrix, the effective road section infection distance between any two adjacent target road sections in the candidate path within the target period can also be obtained through direct calculation. Based on this, in some optional implementations, "obtaining the effective road section infection distance between any two adjacent target road sections in the candidate path within the target period" may include the following steps:

obtaining a third traffic volume; where the third traffic volume is a traffic volume flowing from a first target road section to a second target road section in the two adjacent target road sections within the target period;

obtaining a fourth traffic volume; where the fourth traffic volume is a total traffic volume flowing out from the first target road section within the target period; and calculating the effective road section infection distance between the two adjacent target road sections based on the third traffic volume and the fourth traffic volume.

The above steps can refer to the relevant description of "obtaining the effective road section infection distance of the road section group within the target period", and will not be described in detail here.

Through the above steps, the third traffic volume and the fourth traffic volume can be directly obtained in the embodiment of the present disclosure. Here, the third traffic volume is the traffic volume flowing from the first target road section to the second target road section in the two adjacent target road sections within the target period, and the fourth traffic volume is the total traffic volume flowing out from the first target road section within the target period. After that, the effective road section infection distance between the two adjacent target road sections is then calculated based on the third traffic volume and the fourth traffic volume. On the one hand, the correlation of the effective road section infection distance with the traffic flow between road sections can be deeply explored, and the actual causes of congestion on a road can be reflected in fine detail based on this, thereby further improving the accuracy in determining the congestion source. On the other hand, since the creation process of the distance adjacency matrix is omitted, the amount of data calculation for tracing the source of traffic congestion can be reduced, saving the computing resources of the electronic device.

In some optional implementations, "determining that the correlation between the congestion infection distance and the congestion time difference meets the preset correlation requirement" may include the following step:

determining that the correlation between the congestion infection distance and the congestion time difference meets the preset correlation requirement when the correlation between the congestion infection distance and the congestion time difference is greater than a preset correlation value.

In a specific example, the correlation analysis between the congestion infection distance and the congestion time difference can be performed. For example, the Pearson correlation coefficient between the congestion infection distance and the congestion time difference is calculated as the correlation between the congestion infection distance and the congestion time difference. After that, when the correlation between the congestion infection distance and the congestion time difference is greater than the preset correlation value, it is determined that the correlation between the congestion infection distance and the congestion time difference meets the preset correlation requirement. Here, the preset correlation value can be set according to actual application requirements, and for example, can be set to 0.95, which is not limited in the embodiments of the present disclosure.

Continuing to take the target road network shown in FIG. 5 as an example, the undetermined road section is road section 1 and the target order is 3, so the reference road sections related to the undetermined road section include road section 4, road section 5, road section 6, road section 7, road section 8, road section 9 and road section 10.

It is assumed that the congestion infection distance between the road section 1 and any reference road section, and the congestion time difference between the first congestion moment of the road section 1 within the target period and the second congestion moment of any reference road section within the target period are as shown in Table 2.

TABLE 2

| | Road section 1 |
|---|---|
| Road section 4 | Congestion infection distance: 1.4; Congestion time difference: $T_{14}$ |
| Road section 5 | Congestion infection distance: 1.22; Congestion time difference: $T_{15}$ |
| Road section 6 | Congestion infection distance: 2.92; Congestion time difference: $T_{16}$ |
| Road section 7 | Congestion infection distance: 2.4; Congestion time difference: $T_{17}$ |
| Road section 8 | Congestion infection distance: 3.4; Congestion time difference: $T_{18}$ |
| Road section 9 | Congestion infection distance: 2.32; Congestion time difference: $T_{19}$ |
| Road section 10 | Congestion infection distance: 3.32; Congestion time difference: $T_{110}$ |

Then, the congestion infection distance 1.4 and the congestion time difference $T_{14}$ between the road section 1 and road section 4 can be used as a set of correlation analysis data, the congestion infection distance 1.22 and the congestion time difference Tis between the road section 1 and road section 5 can be used as a set of correlation analysis data, the congestion infection distance 2.92 and the congestion time difference $T_{16}$ between the road section 1 and road section 6 can be used as a set of correlation analysis data, and so on. Finally, 7 sets of correlation analysis data are obtained, and then the Pearson correlation coefficient between the congestion infection distance and the congestion time difference is calculated based on the 7 sets of correlation analysis data, as the correlation between the congestion infection distance and the congestion time difference.

Through the above step, in the embodiment of the present disclosure, when the correlation between the congestion infection distance and the congestion time difference is greater than the preset correlation value, it can be determined that the correlation between the congestion infection distance and the congestion time difference meets the preset correlation requirement, thereby ensuring the strong relevance between the congestion infection distance and the congestion time difference to further improve the accuracy in determining the congestion source.

Figure 9A:
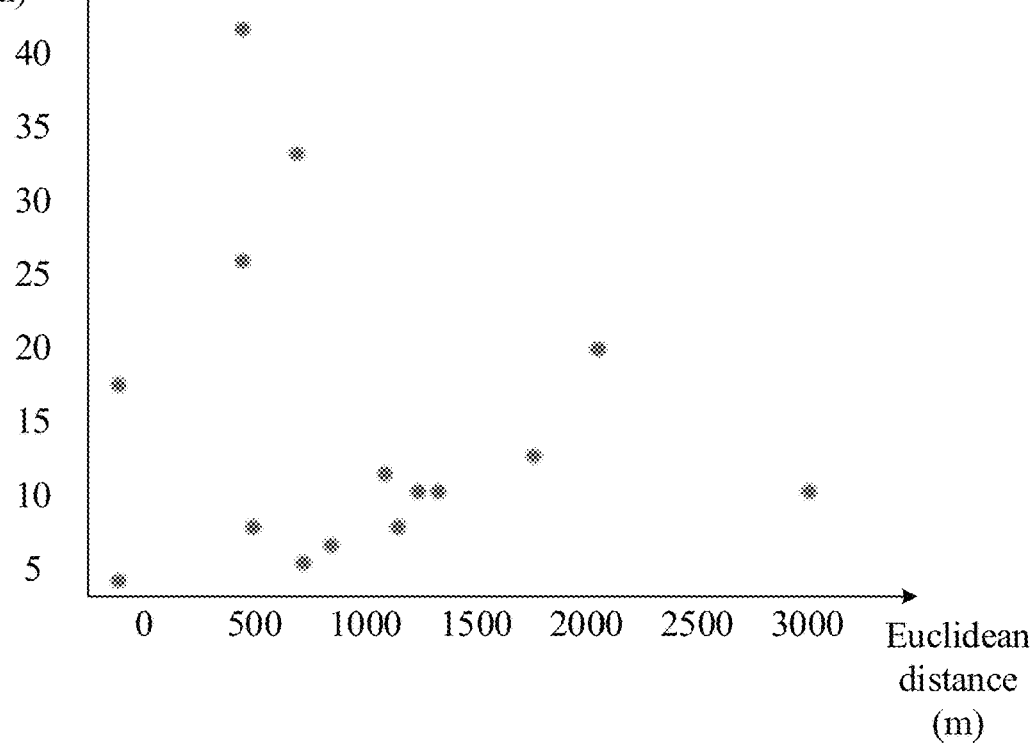
FIGS. 9A, 9B, 9C and 9D are schematic diagrams of four correlation analysis effects according to embodiments of the present disclosure.
Figure 9B:
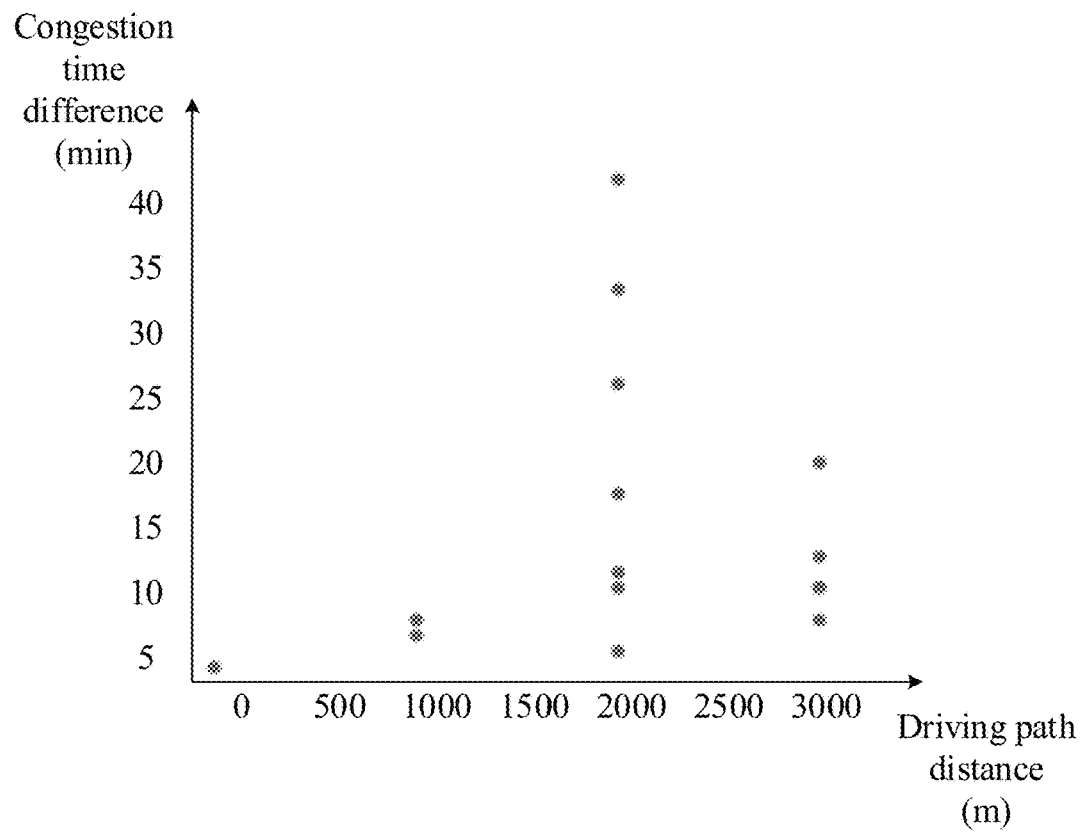
Figure 9C:
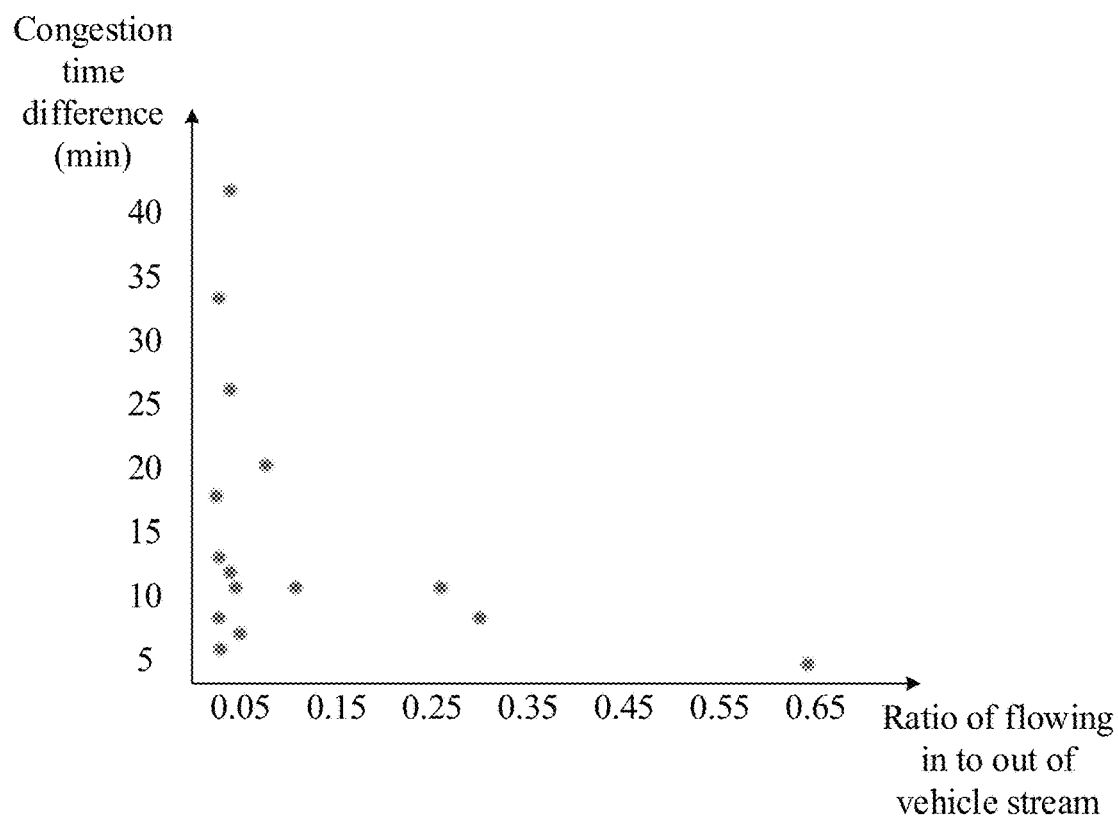

Referring to FIGS. 9A, 9B and 9C, these figures show analysis results obtained by performing the analysis of correlation of the Euclidean distance, the driving path distance and the ratio of flowing in to out of vehicle stream respectively with the congestion time difference between the undetermined road section and the reference road section within the target period. Obviously, the correlation of each of the Euclidean distance, the driving path distance and the ratio of flowing in to out of vehicle stream with the congestion time difference is not obvious.

Figure 9D:
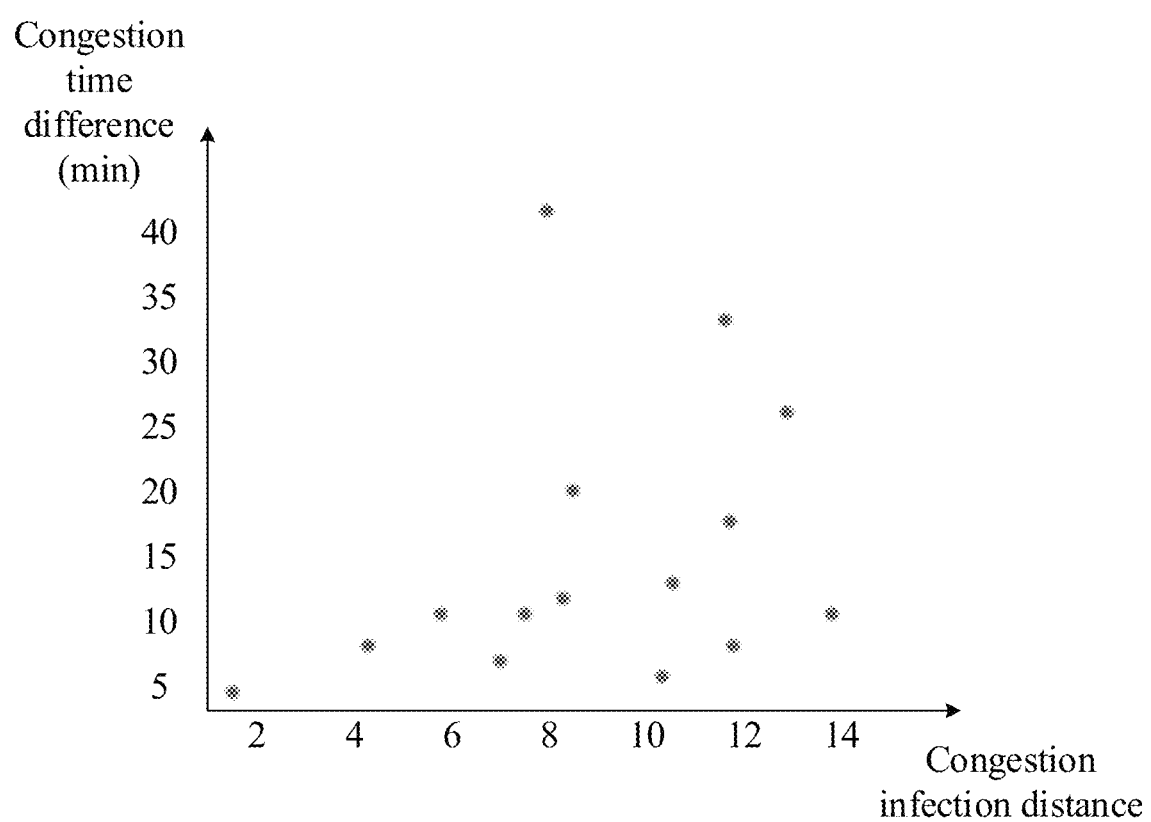

Then referring to FIG. 9D, this figure shows an analysis result obtained by performing the correlation analysis on the congestion infection distance and the congestion time difference between the undetermined road section and the reference road section within the target period. Obviously, there is an obvious positive correlation between the congestion infection distance and the congestion time difference. Also, when the correlation between the congestion infection distance and the congestion time difference is greater than the preset correlation value, it can be determined that the correlation between the congestion infection distance and the congestion time difference meets the preset correlation requirement, and the undetermined road section is determined as the congestion source of the target road network within the target period.

Figure 10:
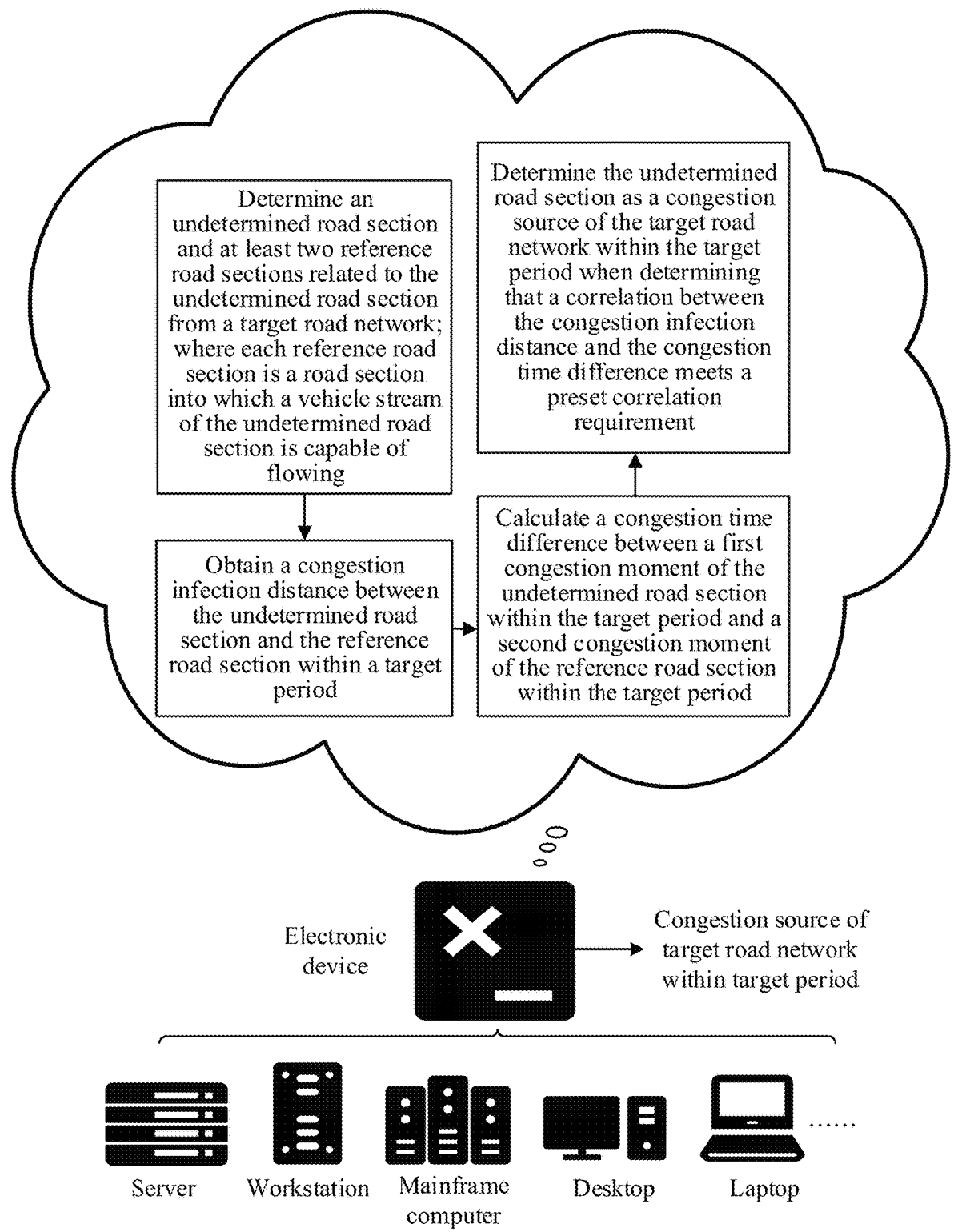
FIG. 10 is a schematic diagram of a scene of a source tracing method for traffic congestion according to an embodiment of the present disclosure.

Referring to FIG. 10, it is a scene schematic diagram of a source tracing method for traffic congestion according to an embodiment of the present disclosure.

As mentioned above, the source tracing method for traffic congestion according to the embodiment of the present disclosure is applied to an electronic device. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices.

The electronic device may be configured to:
determine an undetermined road section and at least two reference road sections related to the undetermined road section from a target road network; where each reference road section is a road section into which a vehicle stream of the undetermined road section is capable of flowing;
obtain a congestion infection distance between the undetermined road section and the reference road section within a target period;

calculate a congestion time difference between a first congestion moment of the undetermined road section within the target period and a second congestion moment of the reference road section within the target period; and determine the undetermined road section as a congestion source of the target road network within the target period when determining that a correlation between the congestion infection distance and the congestion time difference meets a preset correlation requirement.

It should be noted that the scene schematic diagram shown in FIG. 10 is only illustrative and not restrictive in the embodiment of the present disclosure, those skilled in the art can make various obvious changes and/or replacements based on the example of FIG. 10, and the obtained technical solutions still belong to the disclosure scope of the embodiments of the present disclosure.

Figure 11:
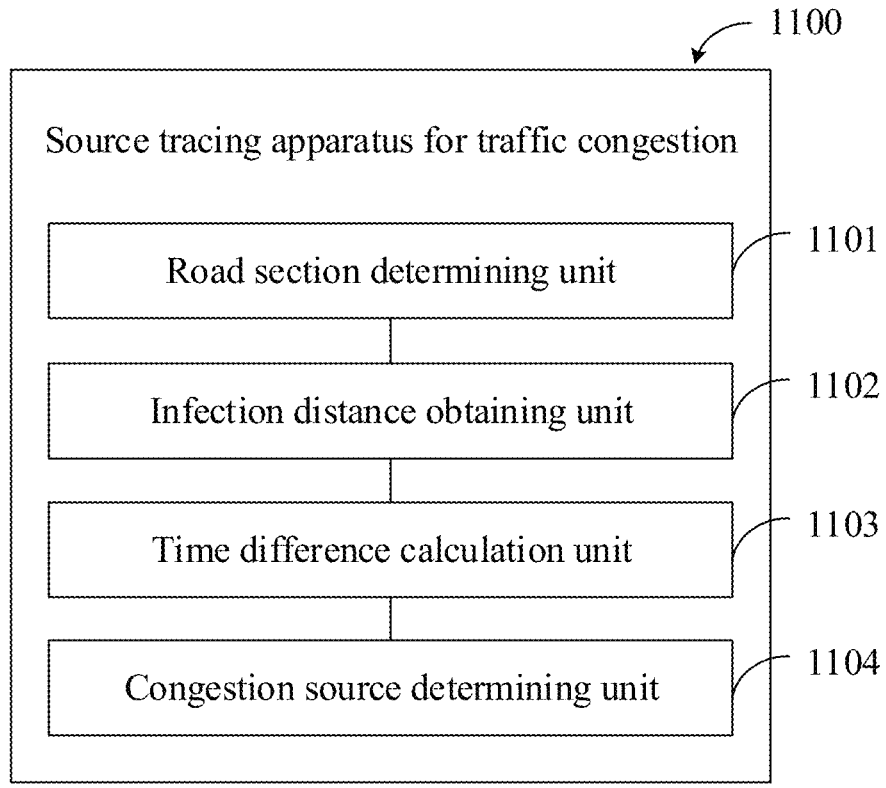
FIG. 11 is a schematic structural block diagram of a source tracing apparatus for traffic congestion according to an embodiment of the present disclosure.

In order to better implement the source tracing method for traffic congestion, an embodiment of the present disclosure further provides a source tracing apparatus for traffic congestion, which can be integrated into an electronic device. Hereinafter, a source tracing apparatus for traffic congestion 1100 according to the embodiment of the present disclosure will be described with reference to the schematic structural diagram shown in FIG. 11.

A road section determining unit 1101 is configured to determine an undetermined road section and at least two reference road sections related to the undetermined road section from a target road network; where each reference road section is a road section into which a vehicle stream of the undetermined road section is capable of flowing.

A infection distance obtaining unit 1102 is configured to obtain a congestion infection distance between the undetermined road section and the reference road section within a target period.

A time difference calculation unit 1103 is configured to calculate a congestion time difference between a first congestion moment of the undetermined road section within the target period and a second congestion moment of the reference road section within the target period.

A congestion source determining unit 1104 is configured to determine the undetermined road section as a congestion source of the target road network within the target period when determining that a correlation between the congestion infection distance and the congestion time difference meets a preset correlation requirement.

In some optional implementations, the infection distance obtaining unit 1102 is configured to:
 determine at least one candidate path related to the reference road section from the target road network; where the candidate path is a path through which a vehicle stream flows in from the undetermined road section and flows out from the reference road section;
 obtain an effective path infection distance of the candidate path within the target period to obtain at least one effective path infection distance; and
 determine an effective path infection distance with a minimum value among the at least one effective path infection distance as the congestion infection distance between the undetermined road section and the reference road section within the target period.

In some optional implementations, the infection distance obtaining unit 1102 is configured to:
 obtain an effective road section infection distance between any two adjacent target road sections in the candidate path within the target period as a target road section infection distance;

when there is one target road section infection distance, determine the target road section infection distance as the effective path infection distance of the candidate path within the target period; and
when there are at least two target road section infection distances, determine a sum of the at least two target road section infection distances as the effective path infection distance of the candidate path within the target period.

In some optional implementations, the infection distance obtaining unit 1102 is configured to:
 query the effective road section infection distance between any two adjacent target road sections in the candidate path within the target period from a distance adjacency matrix.

In some optional implementations, the source tracing apparatus 1100 for traffic congestion further includes a matrix creation unit configured to:
 create a spatial adjacency matrix used to characterize a flow relationship between any two adjacent road sections in the target road network;
 determine a plurality of road section groups based on the spatial adjacency matrix;
 where each of the road section groups includes two adjacent road sections of which a flow relationship is flowable;
 obtain an effective road section infection distance of the road section group within the target period; and
 update the spatial adjacency matrix based on the effective road section infection distance of the road section group within the target period, to obtain the distance adjacency matrix.

In some optional implementations, the matrix creation unit is configured to:
 obtain a first traffic volume; where the first traffic volume is a traffic volume flowing from a first road section to a second road section in the road section group within the target period;
 obtain a second traffic volume; where the second traffic volume is a total traffic volume flowing out from the first road section within the target period; and
 calculate the effective road section infection distance of the road section group within the target period based on the first traffic volume and the second traffic volume.

In some optional implementations, the infection distance obtaining unit 1102 is configured to:
 obtain a third traffic volume; where the third traffic volume is a traffic volume flowing from a first target road section to a second target road section in the two adjacent target road sections within the target period;
 obtain a fourth traffic volume; where the fourth traffic volume is a total traffic volume flowing out from the first target road section within the target period; and
 calculate the effective road section infection distance between the two adjacent target road sections based on the third traffic volume and the fourth traffic volume.

In some optional implementations, the source tracing apparatus 1100 for traffic congestion further includes a period determining unit configured to:
 determine a preset peak period;
 obtain a starting moment of the preset peak period; and
 determine the target period based on the starting moment of the preset peak period.

In some optional implementations, the road section determining unit 1101 is configured to:
 determine a road section with a starting congestion moment earlier than a source tracing cutoff moment in the target road network as the undetermined road section; where the source tracing cutoff moment is an ending moment of the target period.

In some optional implementations, the first congestion moment is a starting congestion moment of the undetermined road section within the target period, and the second congestion moment is a starting congestion moment of the reference road section within the target period;

or, the first congestion moment is a severe congestion moment of the undetermined road section within the target period, and the second congestion moment is a severe congestion moment of the reference road section within the target period.

In some optional implementations, the congestion source determining unit 1104 is configured to:

determine that the correlation between the congestion infection distance and the congestion time difference meets the preset correlation requirement when the correlation between the congestion infection distance and the congestion time difference is greater than a preset correlation value.

For the description of specific functions and examples of the units of the source tracing apparatus 1100 for traffic congestion in the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

According to the embodiments of the present disclosure, the present disclosure also provides an electronic device, a readable storage medium and a computer program product.

Figure 12:
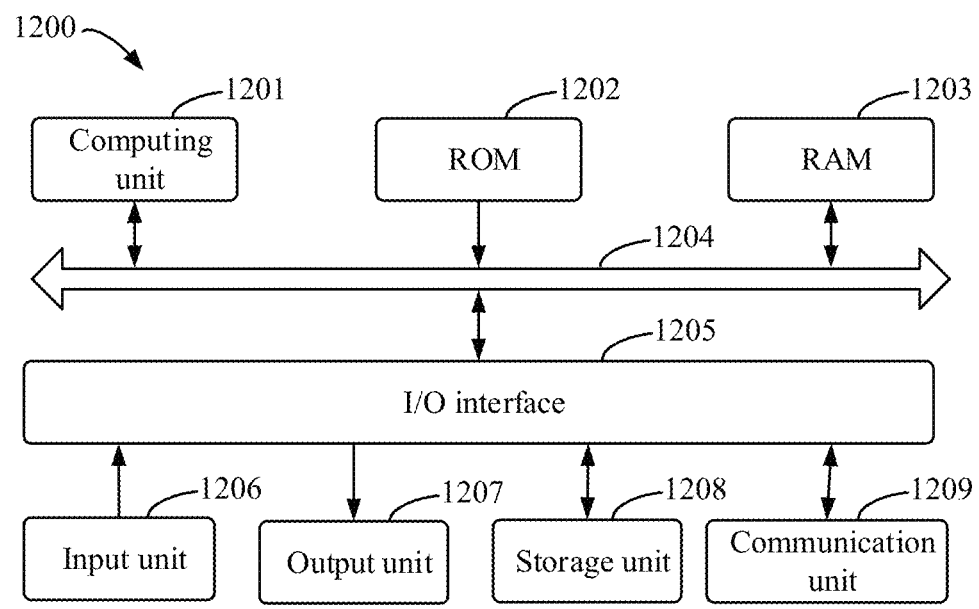
FIG. 12 is a schematic structural block diagram of an electronic device according to an embodiment of the present disclosure.

FIG. 12 shows a schematic block diagram of an exemplary electronic device 1200 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 12, the device 1200 includes a computing unit 1201 that may perform various appropriate actions and processes according to a computer program stored in a Read-Only Memory (ROM) 1202 or a computer program loaded from a storage unit 1208 into a Random Access Memory (RAM) 1203. Various programs and data required for an operation of device 1200 may also be stored in the RAM 1203. The computing unit 1201, the ROM 1202 and the RAM 1203 are connected to each other through a bus 1204. The Input/Output (I/O) interface 1205 is also connected to the bus 1204.

A plurality of components in the device 1200 are connected to the I/O interface 1205, and include an input unit 1206 such as a keyboard, a mouse, or the like; an output unit 1207 such as various types of displays, speakers, or the like; the storage unit 1208 such as a magnetic disk, an optical disk, or the like; and a communication unit 1209 such as a network card, a modem, a wireless communication transceiver, or the like. The communication unit 1209 allows the device 1200 to exchange information/data with other devices through a computer network such as the Internet and/or various telecommunication networks.

The computing unit 1201 may be various general-purpose and/or special-purpose processing components with processing and computing capabilities. Some examples of the computing unit 1201 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 1201 performs various methods and processing described above, such as the source tracing method for traffic congestion. For example, in some implementations, the source tracing method for traffic congestion may be implemented as a computer software program tangibly contained in a computer-readable medium, such as the storage unit 1208. In some implementations, a part or all of the computer program may be loaded and/or installed on the device 1200 via the ROM 1202 and/or the communication unit 1209. When the computer program is loaded into the RAM 1203 and executed by the computing unit 1201, one or more steps of the source tracing method for traffic congestion described above may be performed. Alternatively, in other implementations, the computing unit 1201 may be configured to perform the source tracing method for traffic congestion by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System On Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, an RAM, an ROM, an Erasable Programmable Read-Only Memory (EPROM) or a flash memory, an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display device (e.g., a Cathode Ray Tube (CRT) display or a Liquid Crystal Display (LCD)) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

An embodiment of the present disclosure further provides a non-transitory computer-readable storage medium storing a computer instruction thereon, and the computer instruction is used to cause a computer to execute the source tracing method for traffic congestion.

An embodiment of the present disclosure further provides a computer program product including a computer program, and the computer program implements the source tracing method for traffic congestion, when executed by a processor.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein. Moreover, the relational terms such as "first", "second", "third", etc. in this disclosure are only used to distinguish one entity or operation from another entity or operation, and do not necessarily require or imply any such actual relationship or sequence between these entities or operations.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the principle of the present disclosure shall be included in the protection scope of the present disclosure.

What is claimed is:

1. A source tracing method for traffic congestion, comprising:

determining an undetermined road section from a target road network; wherein the target road network is used to represent a traffic road network of a target area; and the undetermined road section is any specified road section in the target road network, or is a road section with a starting congestion moment earlier than a source tracing cutoff moment in the target road network, and a road section is a driving segment between two adjacent road nodes; wherein the source tracing cutoff moment is an ending moment of a target period, and the target period is a time period, of which a time length is a preset duration threshold, before an arrival of a preset peak period;

determining, based on structural information of the target road network, a reference road section related to the undetermined road section from a target road network; wherein the reference road section is a road section into which a vehicle stream of the undetermined road section is capable of flowing;

obtaining a congestion infection value between the undetermined road section and the reference road section within the target period, by:

determining at least one candidate path related to the reference road section from the target road network; wherein each candidate path of the at least one candidate path is a path through which a vehicle stream is able to flow in from the undetermined road section and flows out from the reference road section;

determining a road section infection value of each pair of two adjacent target road sections in the candidate path within the target period; wherein the road section infection value is used to characterize a transmission speed of congestion from a first road section in the pair of two adjacent target road sections to a second road section in the pair of two adjacent target road sections, and is negatively correlated with the transmission speed;

determining a sum of road section infection values of all pairs of two adjacent target road sections in the candidate path within the target period, as a path infection value of the candidate path within the target period; and determining a path infection value with a minimum value among at least one path infection value corresponding to the at least one candidate path, as the congestion infection value between the undetermined road section and the reference road section within the target period;

calculating a time difference between a first moment of congestion on the undetermined road section and a second moment of congestion on the reference road section within the target period; and determining the undetermined road section as a congestion source of the target road network within the target period, in a case of it is determined that a correlation between the congestion infection value and the time difference is greater than a preset correlation value.

2. The method of claim 1, wherein the determining of the road section infection value of the pair of two adjacent target road sections in the candidate path within the target period, comprises:

querying the road section infection value of the pair of two adjacent target road sections in the candidate path within the target period from a distance adjacency matrix.

3. The method of claim 2, further comprising:

creating a spatial adjacency matrix used to characterize a flow relationship between any two adjacent road sections in the target road network;

determining a plurality of road section groups based on the spatial adjacency matrix;

wherein each road section group of the plurality of road section groups comprises two adjacent road sections of which a flow relationship is flowable;

obtaining a road section infection value of the road section group within the target period; and updating the spatial adjacency matrix based on the road section infection value of the road section group within the target period, to obtain the distance adjacency matrix.

4. The method of claim 3, wherein the obtaining of the road section infection value of the road section group within the target period, comprises:

obtaining a first traffic volume; wherein the first traffic volume is a traffic volume flowing from a third road section to a fourth road section in the road section group within the target period;

obtaining a second traffic volume; wherein the second traffic volume is a total traffic volume flowing out from the third road section within the target period; and calculating the road section infection value of the road section group within the target period based on the first traffic volume and the second traffic volume.

5. The method of claim 1, wherein the determining of the road section infection value of the pair of two adjacent target road sections in the candidate path within the target period, comprises:

obtaining a third traffic volume; wherein the third traffic volume is a traffic volume flowing from the first road section to the second road section within the target period;

obtaining a fourth traffic volume; wherein the fourth traffic volume is a total traffic volume flowing out from the first road section within the target period; and calculating the road section infection value of the pair of two adjacent target road sections based on the third traffic volume and the fourth traffic volume.

6. The method of claim 1, further comprising:

determining the preset peak period;

obtaining a starting moment of the preset peak period; and determining the target period based on the starting moment of the preset peak period.

7. The method of claim 1, wherein the first moment is a starting moment of congestion on the undetermined road section within the target period, and the second moment is a starting moment of congestion on the reference road section within the target period;

or, the first moment is a moment of severe congestion exists on the undetermined road section within the target period, and the second moment is a moment of severe congestion exists on the reference road section within the target period.

8. An electronic device, comprising:

at least one processor;

a memory connected in communication with the at least one processor;

wherein the memory stores an instruction executable by the at least one processor, and the instruction, when executed by the at least one processor, enables the at least one processor to execute:

determining an undetermined road section from a target road network; wherein the target road network is used to represent a traffic road network of a target area; and the undetermined road section is any specified road section in the target road network, or is a road section with a starting congestion moment earlier than a source tracing cutoff moment in the target road network, and a road section is a driving segment between two adjacent road nodes; wherein the source tracing cutoff moment is an ending moment of a target period, and the target period is a time period, of which a time length is a preset duration threshold, before an arrival of a preset peak period;

determining, based on structural information of the target road network, a reference road section related to the undetermined road section from a target road network; wherein the reference road section is a road section into which a vehicle stream of the undetermined road section is capable of flowing;

obtaining a congestion infection value between the undetermined road section and the reference road section within the target period, by:

determining at least one candidate path related to the reference road section from the target road network; wherein each candidate path of the at least one candidate path is a path through which a vehicle stream is able to flow in from the undetermined road section and flows out from the reference road section;

determining a road section infection value of each pair of two adjacent target road sections in the candidate path within the target period; wherein the road section infection value is used to characterize a transmission speed of congestion from a first road section in the pair of two adjacent target road sections to a second road section in the pair of two adjacent target road sections, and is negatively correlated with the transmission speed;

determining a sum of road section infection values of all pairs of two adjacent target road sections in the candidate path within the target period, as a path infection value of the candidate path within the target period; and determining a path infection value with a minimum value among at least one path infection value corresponding to the at least one candidate path, as the congestion infection value between the undetermined road section and the reference road section within the target period;

calculating a time difference between a first moment of congestion on the undetermined road section and a second moment of congestion on the reference road section within the target period; and determining the undetermined road section as a congestion source of the target road network within the target period, in a case of it is determined that a correlation between the congestion infection and the time difference is greater than a preset correlation value.

9. The electronic device of claim 8, wherein the instruction, when executed by the at least one processor, enables the at least one processor to execute:
querying the road section infection value of the pair of any two adjacent target road sections in the candidate path within the target period from a distance adjacency matrix.

10. The electronic device of claim 9, wherein the instruction, when executed by the at least one processor, enables the at least one processor to execute:
creating a spatial adjacency matrix used to characterize a flow relationship between any two adjacent road sections in the target road network;
determining a plurality of road section groups based on the spatial adjacency matrix; wherein each road section group of plurality of the road section groups comprises two adjacent road sections of which a flow relationship is flowable;
obtaining a road section infection value of the road section group within the target period; and
updating the spatial adjacency matrix based on the road section infection value of the road section group within the target period, to obtain the distance adjacency matrix.

11. A non-transitory computer-readable storage medium storing a computer instruction thereon, wherein the computer instruction is used to cause a computer to execute:
determining an undetermined road section from a target road network; wherein the target road network is used to represent a traffic road network of a target area; and the undetermined road section is any specified road section in the target road network, or is a road section with a starting congestion moment earlier than a source tracing cutoff moment in the target road network, and a road section is a driving segment between two adjacent road nodes; wherein the source tracing cutoff moment is an ending moment of a target period, and the target period is a time period, of which a time length is a preset duration threshold, before an arrival of a preset peak period;
determining, based on structural information of the target road network, a reference road section related to the undetermined road section from a target road network; wherein the reference road section is a road section into which a vehicle stream of the undetermined road section is capable of flowing;
obtaining a congestion infection value between the undetermined road section and the reference road section within the target period, by:
determining at least one candidate path related to the reference road section from the target road network; wherein each candidate path of the at least one candidate path is a path through which a vehicle stream is able to flow in from the undetermined road section and flows out from the reference road section;
determining a road section infection value of each pair of two adjacent target road sections in the candidate path within the target period; wherein the road section infection value is used to characterize a transmission speed of congestion from a first road section in the pair of two adjacent target road sections to a second road section in the pair of two adjacent target road sections, and is negatively correlated with the transmission speed;
determining a sum of road section infection values of all pairs of two adjacent target road sections in the candidate path within the target period, as a path infection value of the candidate path within the target period; and
determining a path infection value with a minimum value among at least one path infection value corresponding to the at least one candidate path, as the congestion infection value between the undetermined road section and the reference road section within the target period;
calculating a time difference between a first moment of congestion on the undetermined road section and a second moment of congestion on the reference road section within the target period; and
determining the undetermined road section as a congestion source of the target road network within the target period, in a case of it is determined that a correlation between the congestion infection value and the time difference is greater than a preset correlation value.

12. The non-transitory computer-readable storage medium of claim 11, wherein the determining of the road section infection value of the pair of two adjacent target road sections in the candidate path within the target period, comprises:
querying the road section infection value of the pair of two adjacent target road sections in the candidate path within the target period from a distance adjacency matrix.

13. The non-transitory computer-readable storage medium of claim 12, wherein the computer instruction is used to cause the computer to further execute:
creating a spatial adjacency matrix used to characterize a flow relationship between any two adjacent road sections in the target road network;
determining a plurality of road section groups based on the spatial adjacency matrix; wherein each road section group of the plurality of road section groups comprises two adjacent road sections of which a flow relationship is flowable;
obtaining a road section infection value of the road section group within the target period; and
updating the spatial adjacency matrix based on the road section infection value of the road section group within the target period, to obtain the distance adjacency matrix.

14. The non-transitory computer-readable storage medium of claim 13, wherein the obtaining of the road section infection value of the road section group within the target period, comprises:
obtaining a first traffic volume; wherein the first traffic volume is a traffic volume flowing from a third road section to a fourth road section in the road section group within the target period;
obtaining a second traffic volume; wherein the second traffic volume is a total traffic volume flowing out from the third road section within the target period; and
calculating the road section infection value of the road section group within the target period based on the first traffic volume and the second traffic volume.

15. The non-transitory computer-readable storage medium of claim 11, wherein the determining of the road section infection value of the pair of two adjacent target road sections in the candidate path within the target period, comprises:
- obtaining a third traffic volume; wherein the third traffic volume is a traffic volume flowing from the first road section to the second road section within the target period;
- obtaining a fourth traffic volume; wherein the fourth traffic volume is a total traffic volume flowing out from the first road section within the target period; and
- calculating the road section infection value of the pair of two adjacent target road sections based on the third traffic volume and the fourth traffic volume.

16. The non-transitory computer-readable storage medium of claim 11, wherein the computer instruction is used to cause the computer to further execute:
- determining the preset peak period;
- obtaining a starting moment of the preset peak period; and
- determining the target period based on the starting moment of the preset peak period.

17. The electronic device of claim 10, wherein the obtaining of the road section infection value of the road section group within the target period, comprises:
- obtaining a first traffic volume; wherein the first traffic volume is a traffic volume flowing from a third road section to a fourth road section in the road section group within the target period;
- obtaining a second traffic volume; wherein the second traffic volume is a total traffic volume flowing out from the third road section within the target period; and
- calculating the road section infection value of the road section group within the target period based on the first traffic volume and the second traffic volume.

18. The electronic device of claim 8, wherein the determining of the road section infection value of the pair of two adjacent target road sections in the candidate path within the target period, comprises:
- obtaining a third traffic volume; wherein the third traffic volume is a traffic volume flowing from the first road section to the second road section within the target period;
- obtaining a fourth traffic volume; wherein the fourth traffic volume is a total traffic volume flowing out from the first road section within the target period; and
- calculating the road section infection value of the pair of two adjacent target road sections based on the third traffic volume and the fourth traffic volume.

19. The electronic device of claim 8, wherein the instruction, when executed by the at least one processor, enables the at least one processor to further execute:
- determining the preset peak period;
- obtaining a starting moment of the preset peak period; and
- determining the target period based on the starting moment of the preset peak period.

20. The electronic device of claim 8, wherein the first moment is a starting moment of congestion on the undetermined road section within the target period, and the second moment is a starting moment of congestion on the reference road section within the target period;
- or, the first moment is a moment of severe congestion exists on the undetermined road section within the target period, and the second moment is a moment of severe congestion exists on the reference road section within the target period.

* * * * *